(12) United States Patent
Nakagawa

(10) Patent No.: US 8,819,854 B2
(45) Date of Patent: Aug. 26, 2014

(54) INFORMATION PROCESSING APPARATUS, SYSTEM MANAGEMENT METHOD, AND RECORDING MEDIUM

(75) Inventor: Noriaki Nakagawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 681 days.

(21) Appl. No.: 12/825,748

(22) Filed: Jun. 29, 2010

(65) Prior Publication Data

US 2011/0010779 A1    Jan. 13, 2011

(30) Foreign Application Priority Data

Jul. 8, 2009   (JP) .................................. 2009-162169

(51) Int. Cl.
| | |
|---|---|
| G06F 17/30 | (2006.01) |
| G06F 7/04 | (2006.01) |
| H04N 7/16 | (2011.01) |
| G06F 21/10 | (2013.01) |
| G11B 20/00 | (2006.01) |
| G06F 12/14 | (2006.01) |
| H04K 1/00 | (2006.01) |
| H04L 9/00 | (2006.01) |
| H04L 29/06 | (2006.01) |

(52) U.S. Cl.
CPC .......... *G06F 21/10* (2013.01); *G11B 20/00086* (2013.01); *H04L 63/0428* (2013.01); *H04L 63/12* (2013.01)
USPC .................. 726/30; 726/27; 713/187; 380/28

(58) Field of Classification Search
CPC .............. G06F 21/10; G11B 20/00086; H04L 63/0428; H04L 2463/101; H04L 63/12
USPC .................. 713/150–154, 160–174, 182–186, 713/189–193, 202; 709/225, 229; 726/2–8; 380/28–30, 255–283

See application file for complete search history.

(56) References Cited

U.S. PATENT DOCUMENTS

| | | | |
|---|---|---|---|
| 2006/0161445 A1 | 7/2006 | Frank | |
| 2007/0061799 A1 | 3/2007 | Kimmerly | |
| 2009/0038018 A1* | 2/2009 | Mikami | 726/27 |
| 2009/0285389 A1* | 11/2009 | Matsuo | 380/30 |
| 2010/0318789 A1* | 12/2010 | Teal et al. | 713/156 |

FOREIGN PATENT DOCUMENTS

| | | |
|---|---|---|
| JP | 2005-115920 | 4/2005 |
| JP | 2005-182701 | 7/2005 |
| JP | 2008-35444 | 2/2008 |
| JP | 2008-532106 | 8/2008 |
| JP | 2008-541206 | 11/2008 |
| JP | 2009-508252 | 2/2009 |
| WO | WO2006/113834 A2 | 10/2006 |

\* cited by examiner

*Primary Examiner* — Evans Desrosiers
(74) *Attorney, Agent, or Firm* — Cooper & Dunham LLP

(57) ABSTRACT

In an information processing apparatus, software is installed to build a system providing a predetermined function. The information processing apparatus includes a generating unit configured to generate system identification information for identifying the system built by installing the software, the system identification information being generated from authentication information obtained by performing license authentication on the software; and a registering unit configured to send the system identification information generated by the generating unit to a management device that manages a plurality of the systems via a predetermined data transmission line, to register the system identification information in the management device as management information.

11 Claims, 10 Drawing Sheets

RID — <requestID> BOX,2009-03-18T06:19:04Z, XXXX001 </requestID>

SID — <boxID> XXXX001 </boxID>

DID — <deviceID> Device001 </deviceID>
<deviceID> Device002 </deviceID>
<deviceID> Device003 </deviceID>

FIG.7B

| SYSTEM IDENTIFICATION INFORMATION | SOFTWARE INFORMATION | MANAGEMENT TARGET DEVICE INFORMATION | ...... |
|---|---|---|---|
| XXXX001 | SoftwareA_XX | Device001,002,003, | ...... |
| XXXX002 | SoftwareB_XX | Device107,108,109, | ...... |
| ...... | ...... | ...... | ...... |
| XXXX003 | SoftwareN_XX | Device201,202,203, | ...... |

71

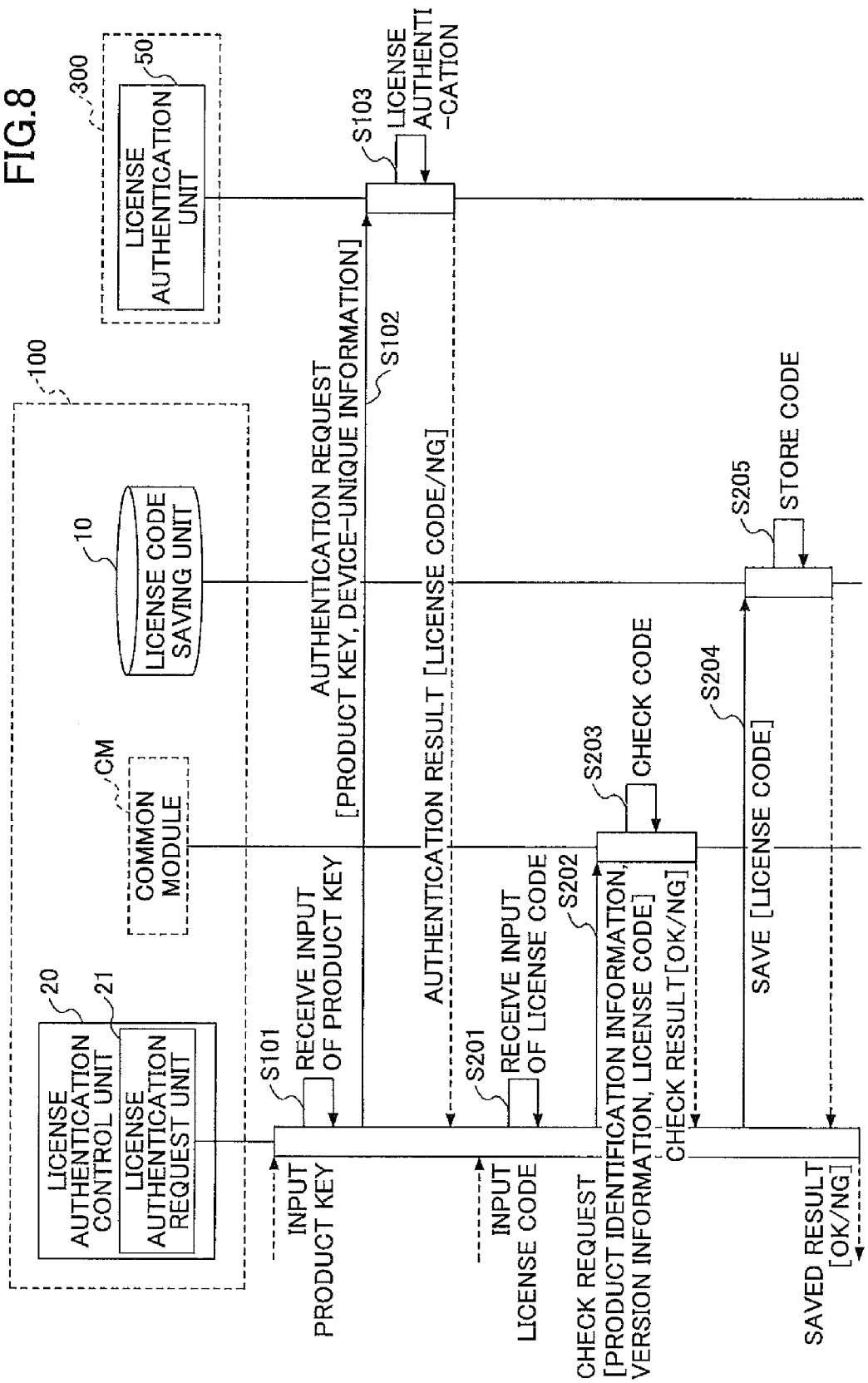

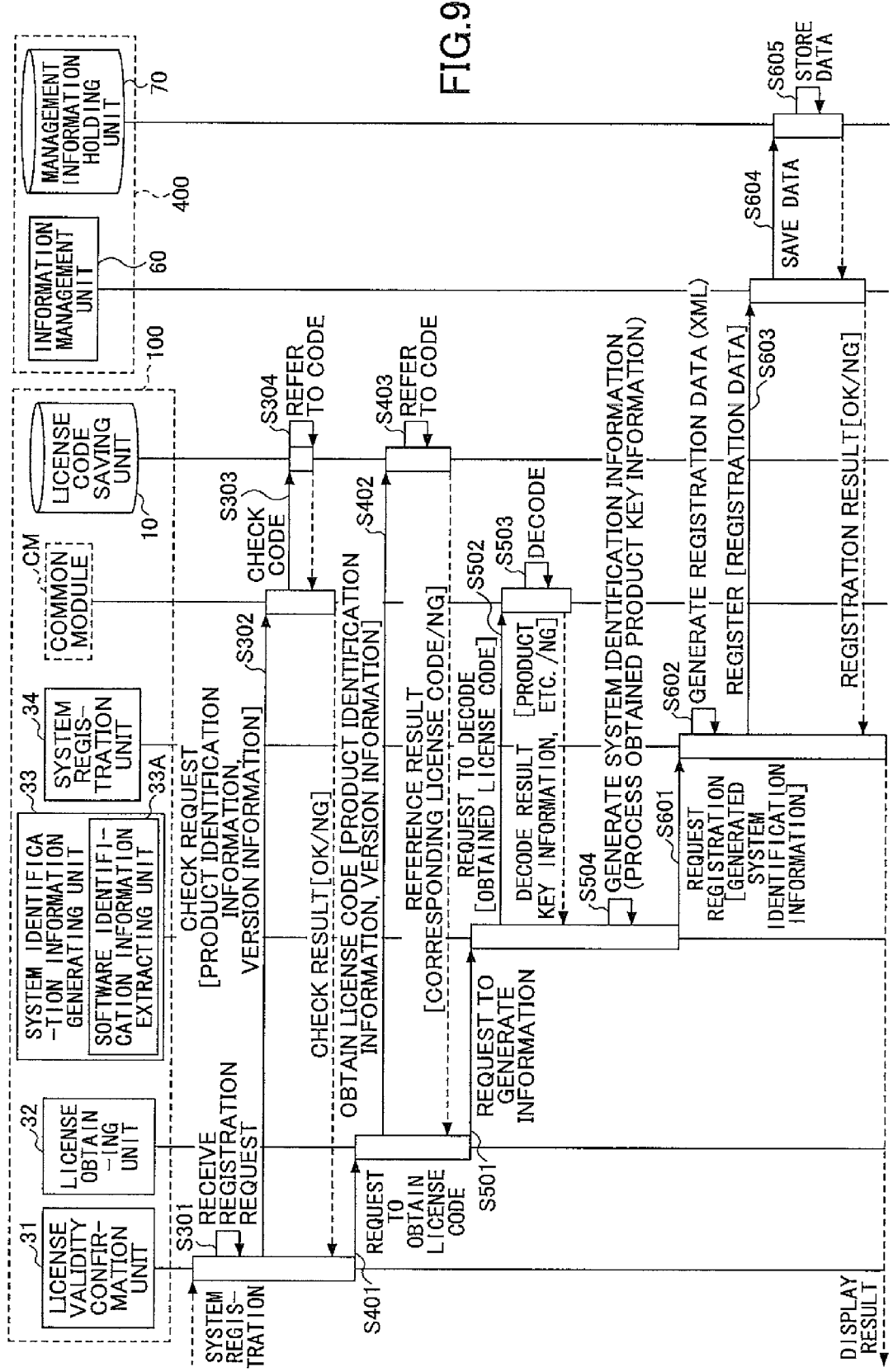

INFORMATION PROCESSING APPARATUS, SYSTEM MANAGEMENT METHOD, AND RECORDING MEDIUM

BACKGROUND OF THE INVENTION

1. Field of the Invention

The present invention relates to an information processing apparatus connected to an internal system built in a local area, and more particularly, to a technology of identifying and managing a system built by installing software in an information processing apparatus, from an external system.

2. Description of the Related Art

With the advancement of the information processing technology such as network communications, there is known a technology of remotely managing an internal system built in a local area, from an external system.

For example, patent document 1 (Japanese Laid-Open Patent Application No. 2008-35444) discloses a system environment including one or more management target systems and a remote management system for remotely managing the management target systems via the Internet. The management target system may be a device management system for managing image processing apparatuses such as an MFP (multifunction peripheral) and a printer, via a predetermined data transmission line, as described in patent document 2 (Japanese Laid-Open Patent Application No. 2005-182701). The device management system manages the image processing apparatus that is a management target, with the use of a device management apparatus having device management functions such as collecting information from the image processing apparatus and updating the software of the image processing apparatus.

In such a system environment, manufacturers can provide various support services to devices installed in a user environment.

However, the conventional system does not consider a method of building systems by providing users with only software for implementing the device management functions, and installing the software in existing information processing apparatuses that are already provided in the user environments.

In the remote management system, device management systems installed in the user environments need to be identified, for the purpose managing the management target systems. For this reason, manufacturers provide users with device management apparatuses, and identify the installed device management systems based on information unique to each device management apparatus (for example, a "serial number" or a "MAC address"). That is to say, the conventional system is based on the premise that device management apparatuses are installed in user environments to build device management systems.

However, in recent years and continuing, user environments are typically already provided with information processing apparatuses that have sufficient processing capabilities for implementing device management functions. In such a case, the user environment does not need to have a new apparatus provided from the manufacturer to implement such functions; the user environment only needs to be provided with the software for implementing the functions.

When device management systems are built by providing only software to user environments, the manufacture needs to provide software including information that can be used by the remote management system to identify the device management system built in the user environment. However, there is a vast variety of methods for providing software, such as distributing the software in various types of recording media or downloading the software. Thus, it is unrealistic for the manufacturer to provide software including information that can be used by the remote management system to identify the device management system.

SUMMARY OF THE INVENTION

The present invention provides an information processing apparatus, a system management method, and a recording medium, in which one or more of the above-described disadvantages are eliminated.

A preferred embodiment of the present invention provides an information processing apparatus, a system management method, and a recording medium, with which a system, which is built by installing software into an apparatus, can be identified from a remote external system.

According to an aspect of the present invention, there is provided an information processing apparatus in which software is installed to build a system providing a predetermined function, the information processing apparatus including a generating unit configured to generate system identification information for identifying the system built by installing the software, the system identification information being generated from authentication information obtained by performing license authentication on the software; and a registering unit configured to send the system identification information generated by the generating unit to a management device that manages a plurality of the systems via a predetermined data transmission line, to register the system identification information in the management device as management information.

According to an aspect of the present invention, there is provided a system management method performed by an information processing apparatus in which software is installed to build a system providing a predetermined function, the system management method including a generating step of generating system identification information for identifying the system built by installing the software, the system identification information being generated from authentication information obtained by performing license authentication on the software; and a registering step of sending the system identification information generated at the generating step to a management device that manages a plurality of the systems via a predetermined data transmission line, to register the system identification information in the management device as management information.

According to an aspect of the present invention, there is provided a computer-readable recording medium that stores therein a system management program that causes a computer to execute a procedure in an information processing apparatus in which software is installed to build a system providing a predetermined function, the procedure including a generating step of generating system identification information for identifying the system built by installing the software, the system identification information being generated from authentication information obtained by performing license authentication on the software; and a registering step of sending the system identification information generated at the generating step to a management device that manages a plurality of the systems via a predetermined data transmission line, to register the system identification information in the management device as management information.

According to one embodiment of the present invention, an information processing apparatus, a system management method, and a recording medium are provided, with which a system, which is built by installing software into an apparatus, can be identified from a remote external system.

BRIEF DESCRIPTION OF THE DRAWINGS

Other objects, features and advantages of the present invention will become more apparent from the following detailed description when read in conjunction with the accompanying drawings, in which:

FIGS. 7A and 7B illustrate an example of data used for remote system management according to an embodiment of the present invention;

FIG. 8 is a sequence diagram of a process of issuing/saving a license code according to an embodiment of the present invention; and FIG. 9 is a sequence diagram of a process of system registration according to an embodiment of the present invention.

DETAILED DESCRIPTION OF THE PREFERRED EMBODIMENTS

A description is given, with reference to the accompanying drawings, of embodiments of the present invention.

<System Configuration>

Figure 1:
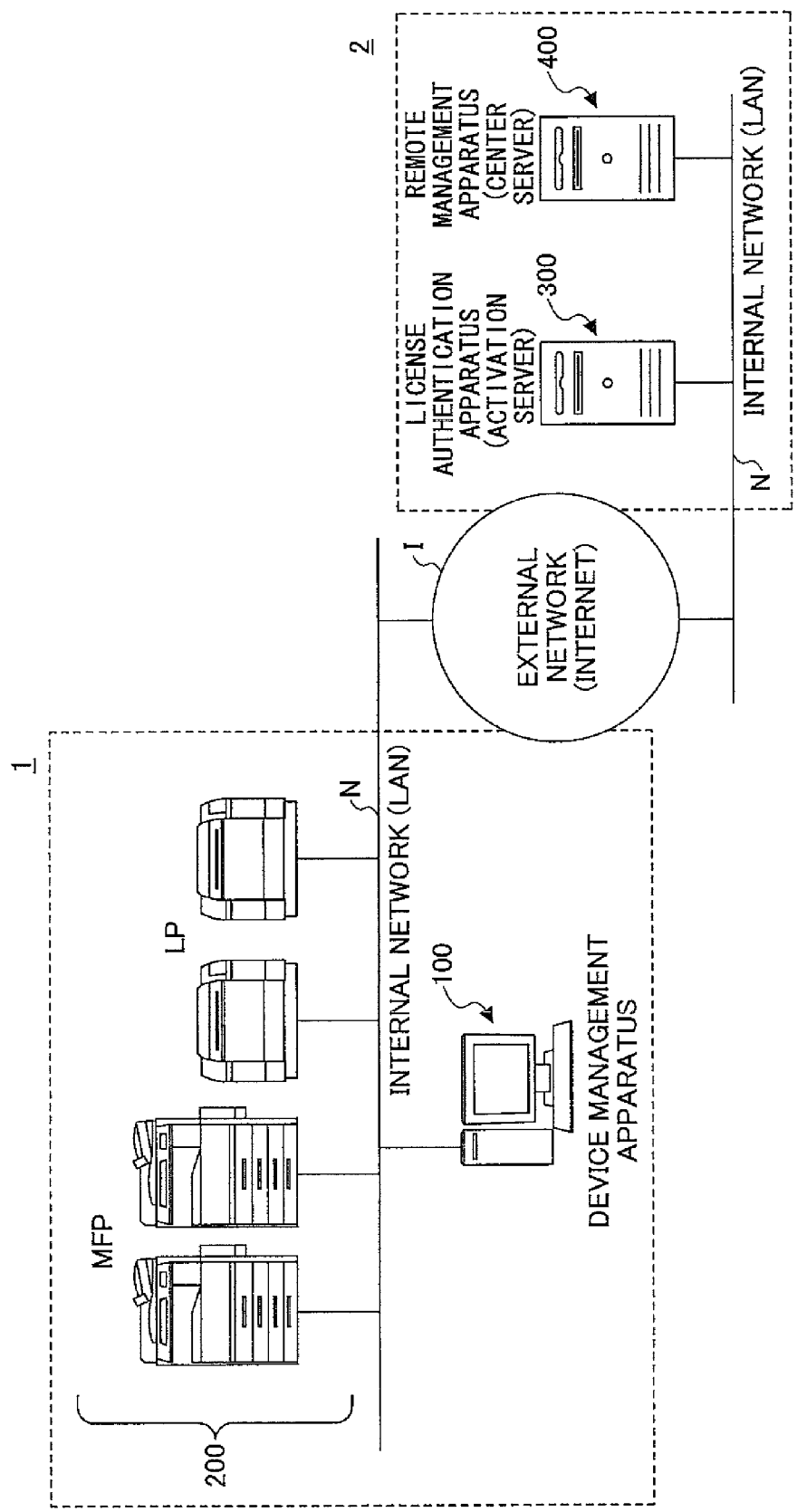
FIG. 1 illustrates a device management system according to an embodiment of the present invention.

FIG. 1 illustrates a device management system 1 according to an embodiment of the present invention.

As shown in FIG. 1, the device management system 1 includes one or more image processing apparatuses (management target devices) 200 (hereinafter, "devices 200") and a device management apparatus 100, which are connected to each other via an internal network N such as LAN (Local Area Network).

The device management system 1 is connected to a remote management system 2 via an external network I such as the Internet. The remote management system 2 includes a license authentication apparatus (activation server) 300 and a remote management apparatus (center server) 400, which are connected to each other by an internal network N. The device management system 1 and the remote management system 2 are typically connected to the external network I via firewall (not shown).

In such a system configuration, the device management apparatus 100 monitors/manages the devices 200 based on device information (for example, "operation status information") obtained from the devices 200. The remote management apparatus 400 collects device information of the devices 200 obtained by the device management apparatus 100, and remotely manages the devices 200 by providing support services such as maintenance and operations. The device management apparatus 100 manages various software items installed in the devices 200 by sending, to the license authentication apparatus 300, license authentication requests (activation) for software (function implementation program) to be operated in the devices 200.

In the following descriptions, the device management system 1 built in the user environment corresponds to an internal system, and the remote management system 2 built at the manufacturer corresponds to an external system.

<Hardware Configuration>

Next, a description is given of a hardware configuration of the device management apparatus 100 according to the present embodiment.

Figure 2:
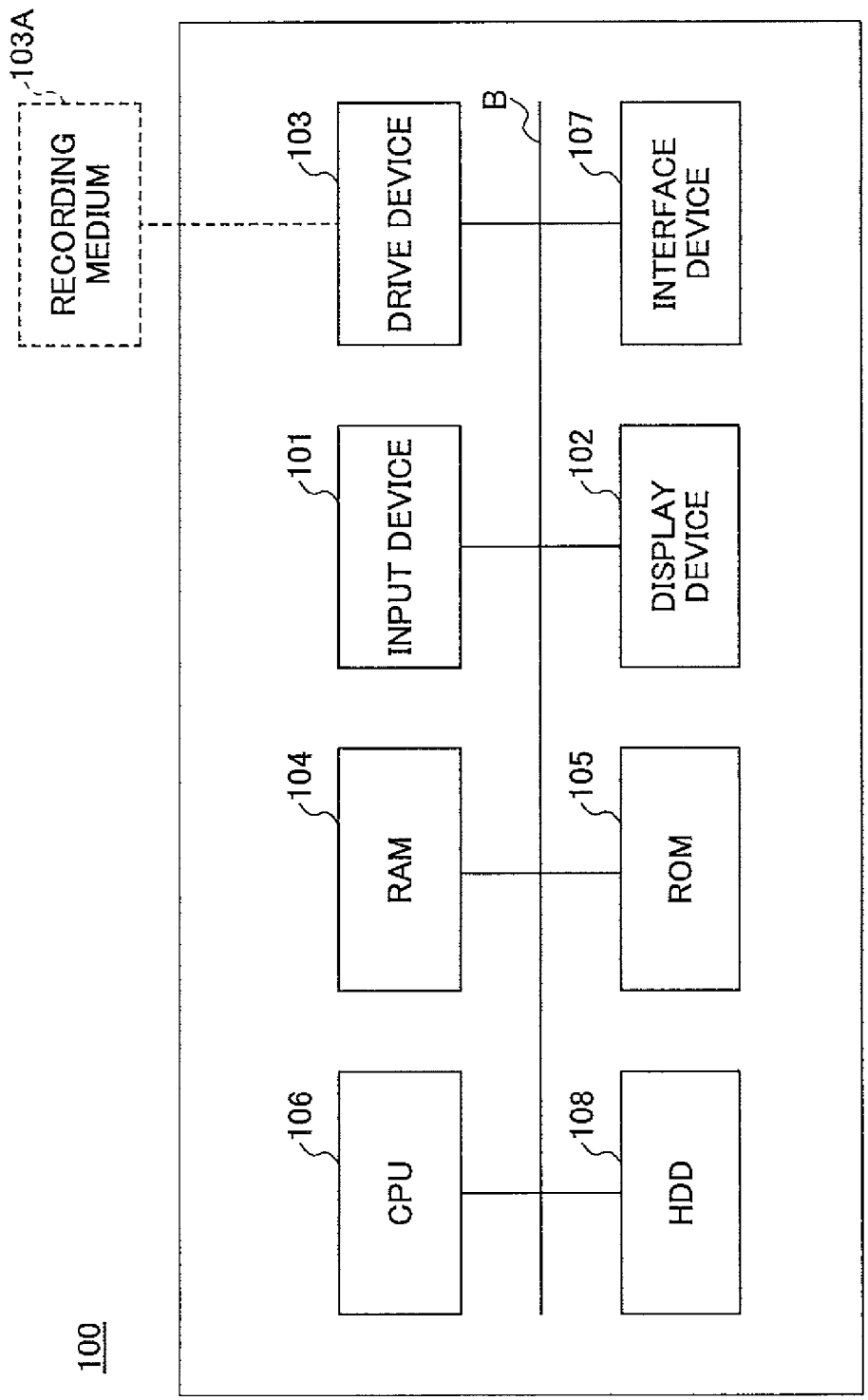
FIG. 2 illustrates a hardware configuration of a device management apparatus according to an embodiment of the present invention.

FIG. 2 illustrates a hardware configuration of the device management apparatus 100 according to the present embodiment.

As shown in FIG. 2, the device management apparatus 100 includes an input device 101, a display device 102, a drive device 103, a RAM (Random Access Memory) 104, a ROM (Read Only Memory) 105, a CPU (Central Processing Unit) 106, an interface device 107, and a HDD (Hard Disk Drive) 108, which are connected to each other by a bus B.

The input device 101 includes a keyboard and a mouse, and is used for inputting various operation signals to the device management apparatus 100. The display device 102 includes a display, and displays processing results (for example, "device information" and "system management information") obtained by the device management apparatus 100.

The interface device 107 is an interface for connecting the device management apparatus 100 to a predetermined data transmission line N such as a network. Thus, the device management apparatus 100 can perform data communications with the devices 200 and the external system 2 via the interface device 107.

The HDD 108 is a nonvolatile storage device storing various programs and data. The stored programs and data include an information processing system for controlling the entire device management apparatus 100 (for example, basic software which is an OS (Operating System) such as "Windows (registered trademark)" and "UNIX (registered trademark)"), and applications for providing various functions in the information processing system (for example, "device management function" and "system management function"). The HDD 108 manages the stored programs and data with a predetermined file system and/or a DB (Data Base).

The drive device 103 is an interface between the device management apparatus 100 and a removable recording medium 103A. Accordingly, the device management apparatus 100 can write in/read from the recording medium 103A via the drive device 103.

The ROM 105 is a nonvolatile semiconductor memory (storage device) that can hold internal data even after the power is turned off. The ROM 105 stores BIOS (Basic Input/Output System) that is executed when the device management apparatus 100 is activated, and data relevant to system settings and network settings of the device management apparatus 100.

The RAM 104 is a volatile semiconductor memory (storage device) for temporarily holding programs and data read from the storage devices described above. The CPU 106 executes the programs loaded in the RAM 104 to implement operations of controlling the entire device management apparatus 100 and various functions installed in the device management apparatus 100.

The device management apparatus 100 has substantially the same configuration as that of a PC (Personal Computer), based on the above description of the hardware configuration. Therefore, the device management apparatus 100 can be replaced by an information processing apparatus.

<Software Configuration>

Next, a description is given of a software configuration of the device management apparatus 100 according to the present embodiment.

Figure 3:
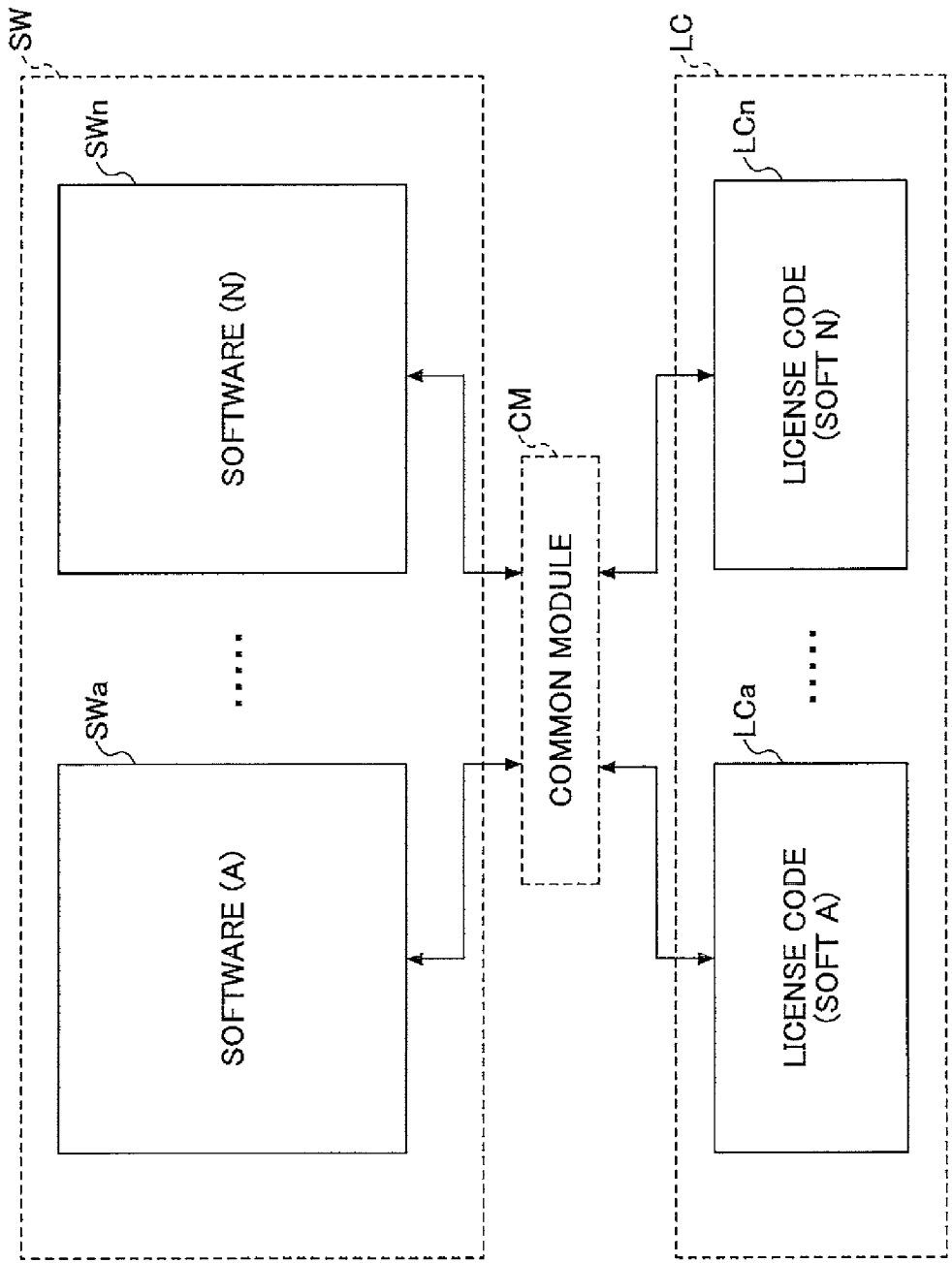
FIG. 3 illustrates a software configuration of the device management apparatus according to an embodiment of the present invention.

FIG. 3 illustrates a software configuration of the device management apparatus 100 according to the present embodiment.

As shown in FIG. 3, there are one or more software SW items (function implementation programs) in the device management apparatus 100. The device management apparatus 100 requires a license code LC issued by the license authentication apparatus 300 in order to cause these software SW items to operate (to function). That is to say, the software SW items cannot operate (function) unless there are corresponding license codes LC in a predetermined storage inside the device management apparatus 100. Thus, in the device management apparatus 100, one or more license codes LC corresponding to software SW items issued by the license authentication apparatus 300 are managed in a predetermined file system.

The device management apparatus 100 has a common module CM provided between the software SW and the license code LC. The common module CM is for implementing comprehensive functions relevant to license management. For example, functions implemented by the common module CM include a function for determining the authenticity/validity of the license code LC based on information relevant to the software SW (authenticity/validity determination function) and a function for responding to information relevant to the software SW included in the license code LC (relevant information responding function).

Accordingly, in the device management apparatus 100, the software SW confirms the authenticity/validity of the corresponding license code LC through the common module CM, and operates (functions) if the confirmation result (determination result from the common module CM) is normal. For example, in the software configuration shown in FIG. 3, software (A) SWA determines the authenticity/validity of a license code (soft A) LCA based on the common module CM. The software (N) SWN determines the authenticity/validity of a license code (soft N) LCN based on the common module CM.

As described above, in the device management apparatus 100 according to the present embodiment, the software SW cannot operate unless its license has been authenticated. That is to say, with the device management apparatus 100, in order to implement the internal system 1 such as a device management system (device management function), the license of the corresponding software SW needs to be authenticated.

<System Management Function>

A description is given of a system management function according to the present embodiment.

The device management apparatus 100 according to the present embodiment generates system identification information for identifying the internal system 1 that is built by installing software. The system identification information is generated from authentication information (license code LC) obtained by performing license authentication on the software SW. Subsequently, the device management apparatus 100 transmits the generated system identification information to the external system 2 through a predetermined data transmission line, and registers the system identification information as management information. The device management apparatus 100 according to the present embodiment includes the above-described system management function.

As described above, instead of installing a dedicated apparatus (for device management) in the user environment, software SW can be installed in an existing information processing apparatus that is already provided in the user environment, to build the internal system 1 for implementing various functions. Furthermore, the manufacturer would like to identify the internal systems 1 with the external system 2 built at the manufacturer, and provide appropriate maintenance/operations according to the user environments.

In the conventional technology, the internal systems 1 are identified based on information unique to the dedicated devices (device-unique information) collected from the dedicated devices (for example, a "serial number" or a "MAC address"). However, as described above, when the internal system 1 is built by installing software, the internal system 1 may be in a Virtual Machine (VM) environment, and therefore the external system 2 may not always be able identify the internal system 1 based on the device-unique information of the device having the software SW installed. For example, in a virtual machine environment, the user can change the MAC address. If the device-unique information is changed, the external system 2 cannot identify the internal system 1 that is built by installing software. Furthermore, the device into which the software is installed, i.e., the device in which the internal system 1 is built, belongs to the user. Thus, the user may not want the external system 2 at the manufacturer to collect information from the device.

Therefore, the device management apparatus 100 according to the present embodiment generates information, which is used for identifying the internal system 1 built by installing software, based on the authentication information of the software SW, and registers the generated information in the external system 2.

Accordingly, with the device management apparatus 100 according to the present embodiment, the system built in the device management apparatus 100 by installing software can be identified by the external system 2 that is located remote from the device management apparatus 100. As a result, even if the device management system 1 is built by installing software, the remote management system 2 at the manufacturer can manage the system built in the user environment.

The configuration and operations of the system management functions are described below.

Figure 4:
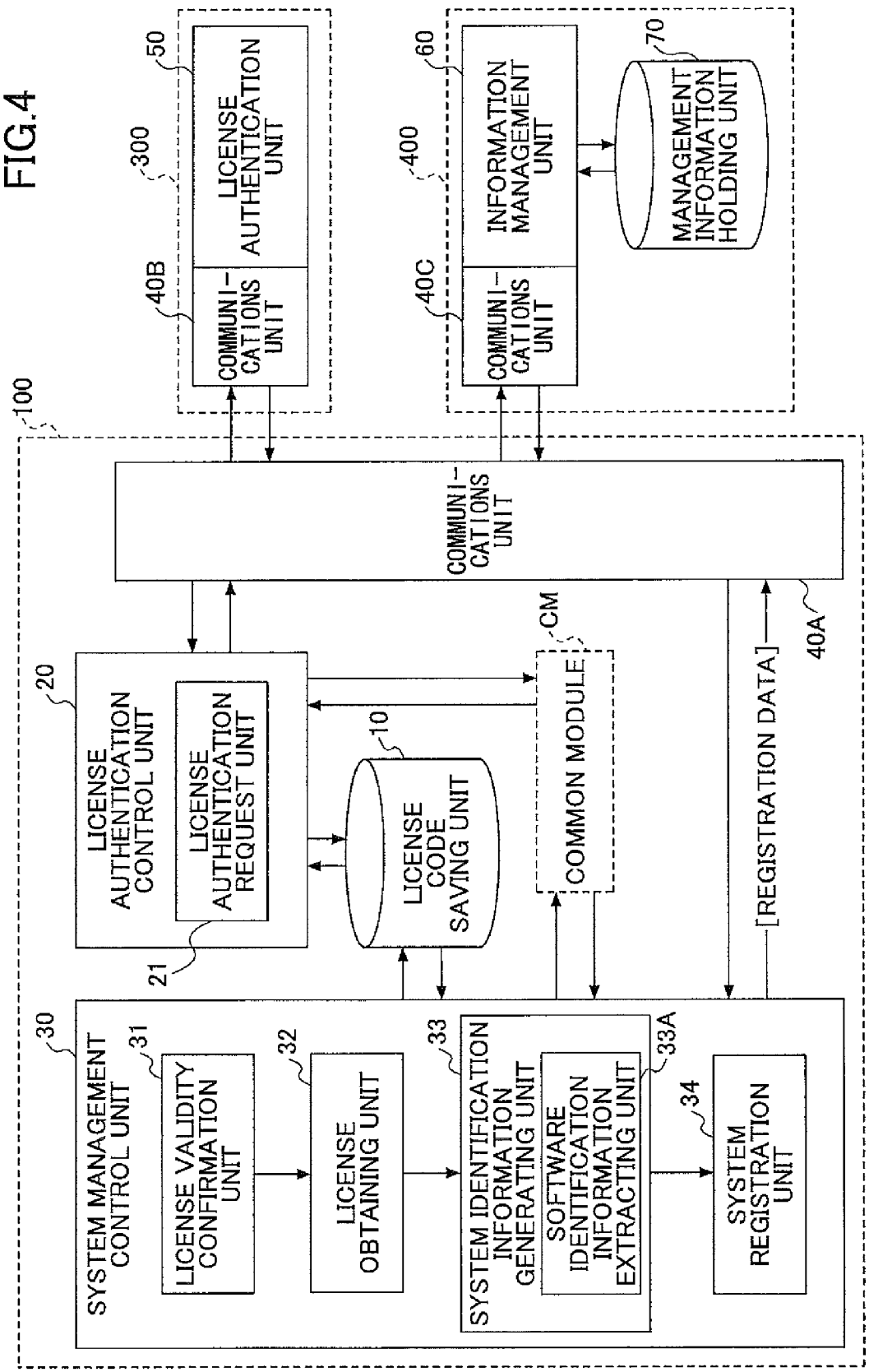
FIG. 4 illustrates a functional configuration of the device management apparatus according to an embodiment of the present invention.

FIG. 4 illustrates a functional configuration of the device management apparatus 100 according to the present embodiment.

As shown in FIG. 4, the device management apparatus 100 is mainly configured with a license authentication control unit 20 and a system management control unit 30.

The license authentication control unit 20 is a function unit for managing/controlling license authentication of the software SW installed in the device management system 1. The system management control unit 30 is a function unit for managing/controlling the internal system 1 built by installing the software SW.

A description is given of the license authentication control unit 20. The license authentication control unit 20 includes a license authentication request unit 21 that sends a license authentication request for the software SW, from the device management apparatus 100 to the license authentication apparatus 300.

The license authentication apparatus 300 includes a license authentication unit 50 for generating a license code LC in response to an authentication request, and returns the license code LC to the request source. The license code LC is generated based on a product key provided from the vendor to the user in association with the software SW, and device-unique information of the device 200 into which the software SW has been installed (the software-installed device).

Thus, when the license authentication request unit 21 makes an authentication request, the license authentication request unit 21 sends the product key and the device-unique information to the license authentication apparatus 300. Communications between the device management apparatus 100 and the license authentication apparatus 300 are performed by a communications unit 40A (in the device management apparatus 100) and a communications unit 40B (in the license authentication apparatus 300).

The license authentication control unit 20 stores, in a license code saving unit 10, the license code LC that is returned from (issued by) the license authentication apparatus 300. The license code saving unit 10 corresponds to a predetermined storage area in a storage device (for example, the HDD 108) provided in the device management apparatus 100.

Figure 5:
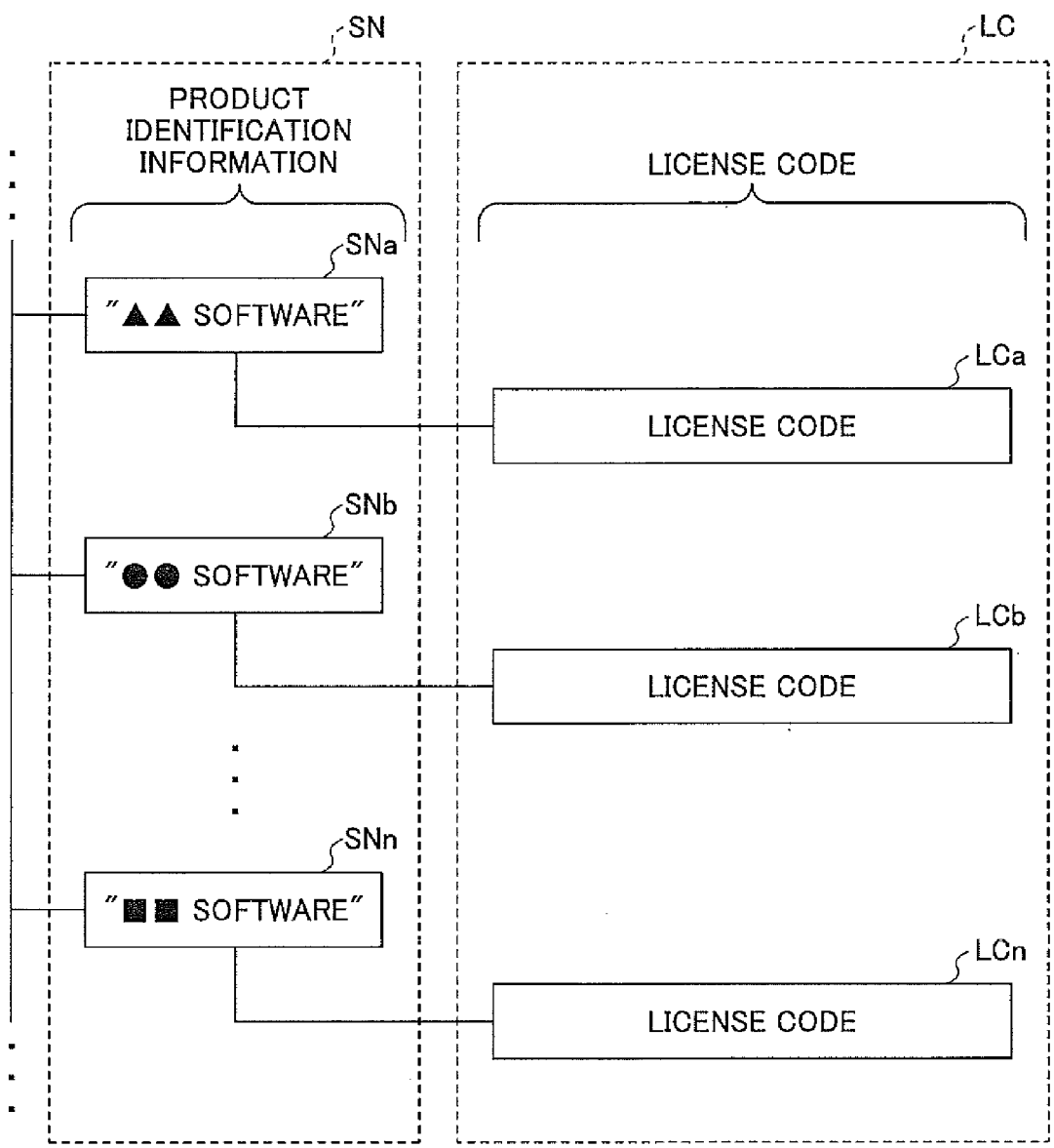
FIG. 5 illustrates an example of data for managing license codes according to an embodiment of the present invention.

FIG. 5 illustrates an example of data for managing license codes according to the present embodiment.

The license code saving unit 10 manages license codes LC corresponding to software SW in a directory structure as shown in FIG. 5. In the directory structure in FIG. 5, under each layer (in each folder) of product identification information SN such as a character string or a code for identifying the software SW, a corresponding license code LC is saved. According to this data structure, a license code LC corresponding to software SW can be identified based on the product identification information SN.

The license authentication control unit 20 confirms the authenticity/validity of the license code LC with the use of the common module CM, before saving the license code in the license code saving unit 10.

The common module CM can determine the authenticity/validity of the license code LC based on information relevant to software SW (has an authenticity/validity determination function). The license authentication control unit 20 passes, to the common module CM, the license code LC returned from the license authentication apparatus 300 together with the product identification information SN and version information of the software SW that is the target of authenticity/validity determination. Accordingly, the license authentication control unit 20 can confirm whether the license is normal based on the authenticity/validity determination results made by the common module CM.

The license authentication control unit 20 saves the license code LC that is confirmed as being normal, in the license code saving unit 10.

Next, a description is given of the system management control unit 30. The system management control unit 30 includes a license validity confirmation unit 31, a license obtaining unit 32, a system identification information generating unit 33, and a system registration unit 34. The system management control unit 30 operates these function units in coordination with each other to register, in the remote management apparatus 400 installed at the manufacturer, the internal system 1 built by installing software SW in the device management system 1.

The license validity confirmation unit 31 is a function unit for confirming the authenticity/validity of the license code LC corresponding to the software SW for implementing functions of the internal system 1 to be registered.

The common module CM can determine the authenticity/validity of the license code LC based on information relevant to software SW (has a authenticity/validity determination function). The license validity confirmation unit 31 passes, to the common module CM, the product identification information SN and version information of the software SW that is the target of authenticity/validity determination. Accordingly, the license validity confirmation unit 31 can confirm whether the license is normal based on the authenticity/validity determination results made by the common module CM.

The license obtaining unit 32 is a function unit for obtaining a license code LC from the license code saving unit 10. The license obtaining unit 32 obtains a license code LC that is confirmed as being normal (authentic/valid) by the license validity confirmation unit 31. The license obtaining unit 32 accesses the license code saving unit 10 and obtains a corresponding license code LC based on the product identification information SN of the software SW.

The system identification information generating unit 33 is a function unit for generating system identification information based on the obtained license code LC. The system identification information is used by the external system 2 at the manufacturer for identifying the internal system 1 of the user. The system identification information generating unit 33 generates the system identification information as follows.

Figure 6A:
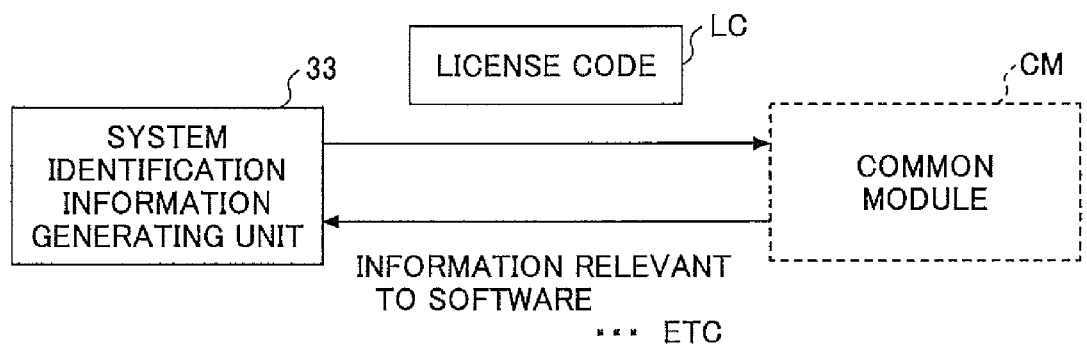
FIGS. 6A and 6B are for describing the operation of generating system identification information according to an embodiment of the present invention.
Figure 6B:
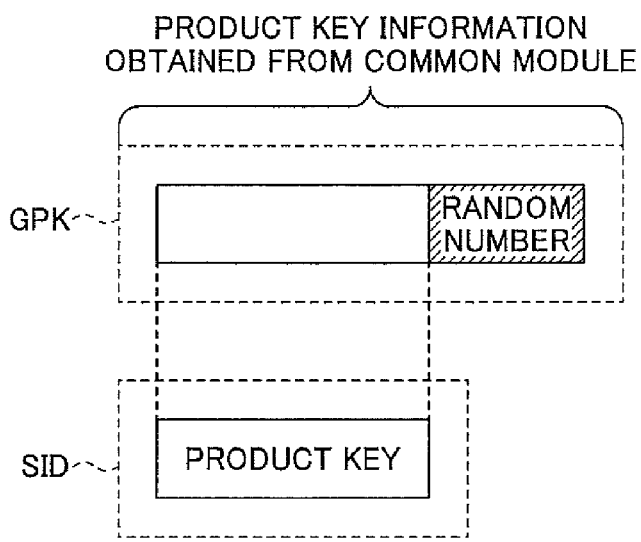

FIGS. 6A and 6B are for describing the operation of generating system identification information SID according to an embodiment of the present invention.

The system identification information generating unit 33 decodes an obtained license code LC with the use of the common module CM.

The common module CM can return information relevant to software SW included in the license code LC (has a relevant information responding function). As shown in FIG. 6A, the system identification information generating unit 33 passes the license code LC to the common module CM, and obtains information relevant to the software SW from the common module CM. Accordingly, the license code LC is decoded.

The system identification information generating unit 33 can obtain information such as the product identification information SN, the version information, and the product key information of the software SW. Furthermore, the system identification information generating unit 33 may obtain device identification information for identifying the software-installed device 200, the license issue date, the license expiration date, the license type (for example, "permanent/trial", "exclusive/additional", and in the case of a common license, "number of retained licenses", "standalone/network"). The information that can be obtained depends on the specification of the common module CM and the license authentication apparatus 300.

Next, as shown in FIG. 6B, the system identification information generating unit 33 obtains system identification information SID from product key information GPK (product key information obtained by decoding the license code) from the common module CM.

FIG. 6B illustrates an operation of generating the system identification information SID. The obtained product key information GPK is relevant to a product key that is embedded when the license authentication apparatus 300 generates the license code LC. Thus, the obtained product key information GPK includes random numbers of certain digits for the purpose of enhancing the confidentiality of the code.

The system identification information generating unit 33 extracts, from the obtained product key information GPK, a formal product key provided for the software SW from the vendor, and uses the extracted product key as the system identification information SID. Specifically, a software identification information extracting unit 33A deletes the random numbers from the product key information GPK, and extracts the product key. The product key is software identification information for identifying the software SW. Thus, the product key (software identification information) is appropriate for the function implemented by operating the software SW, i.e., for identifying the internal system 1.

As described above, the system identification information generating unit 33 uses the license code LC corresponding to the software SW to generate system identification information SID for identifying the internal system 1 built by installing software.

The system registration unit 34 is a function unit for sending the generated system identification information SID to the remote management apparatus 400, to perform system registration.

The remote management apparatus 400 includes an information management unit 60, and uses the information management unit 60 to manage information (hereinafter, "management information") relevant to the internal system 1 built in the user environment that is a remote management target, in order to provide a service. The information management unit 60 performs various data operations on the management information held by a management information holding unit 70. The management information holding unit 70 is a predetermined storage area of the storage device provided in the remote management apparatus 400. The management information holding unit 70 holds the management information in association with the system identification information SID, information relevant to the software SW (software information), and information relevant to the devices 200 managed in the internal system 1 (management target device information). A specific example of a data configuration of the management information held by the management information holding unit 70 is described below.

The system registration unit 34 stores the generated system identification information as management information, and generates registration data to be registered in the remote management apparatus 400.

FIGS. 7A and 7B illustrate an example of data used for remote system management according to the present embodiment.

For example, the system registration unit 34 generates registration data 80 as shown in FIG. 7A. FIG. 7A illustrates an example of the registration data 80 described in XML (eXtensible Markup Language). The registration data 80 is mainly formed by registration request identification information RID, system identification information SID, and device identification information DID.

The registration request identification information RID is used by the external system 2 to determine which of the internal systems 1 made the registration request and when the registration request was made. The system identification information SID is generated by the system identification information generating unit 33. The device identification information DID is for identifying the device 200 (management target device) managed in the internal system 1 to be registered.

These information items are defined in the data with predetermined tags. For example, in the registration data 80 in FIG. 7A, the registration request identification information RID is defined by <requestID> tags. The system identification information SID is defined by <boxID> tags. The device identification information DID is defined by <deviceID> tags. There may be cases where the internal system 1 to be registered includes plural devices 200. Therefore, in the registration data 80, a single system identification information SID item may be associated with plural device identification information DID items.

The system registration unit 34 sends the registration data 80 to the remote management apparatus 400 to perform system registration. Communications between the device management apparatus 100 and the remote management apparatus 400 are performed by the communications unit 40A (in the device management apparatus 100) and a communications unit 40C (in the remote management apparatus 400).

Thus, in the remote management apparatus 400, the information management unit 60 stores corresponding data in the management information items held by the management information holding unit 70, based on the received registration data 80. FIG. 7B illustrates an example of a data configuration of management information 71 held by the management information holding unit 70. As described above, the management information holding unit 70 stores data obtained from various information items included in the registration data 80.

Accordingly, with the device management apparatus 100 according to the present embodiment, the external system 2 that is remotely located (for example, a remote management system at the manufacturer) can identify a system (for example, a device management system at the user's site) built by installing software in the device management system 1.

As described above, the system management function according to the present embodiment can be implemented as the above function units operate in coordination with each other.

Next, detailed operations of the system management functions (operations of function units performed in coordination with each other) are described with reference to a sequence diagram.

The system management function is implemented as the CPU 106 loads a system management program (software component) installed in the device management apparatus 100 into the RAM 104 from a storage destination (for example, the ROM 105), and executes the loaded system management program.

In the following descriptions, operations of the system management functions are divided into the process of "issuing/saving a license code" and the process of "system registration". The process of "system registration" is performed on condition that the process of "issuing/saving a license code" has already been performed.

FIG. 8 is a sequence diagram of the process of "issuing/saving a license code" according to the present embodiment.

<Issuing a License Code>

The device management apparatus 100 receives, with the license authentication control unit 20, a product key provided by the vendor and input by the user when the user makes an authentication request via a predetermined GUI (Graphical User Interface) relevant to license authentication (step S101).

The license authentication request unit 21 of the license authentication control unit 20 sends an authentication request for the software SW to the license authentication apparatus 300 (step S102). Specifically, the license authentication request unit 21 sends an input product key and device-unique information (device information of the device 200 in which the software SW is installed) to the license authentication apparatus 300 to make the authentication request.

The license authentication unit 50 of the license authentication apparatus 300 performs license authentication for the software SW (step S103). Specifically, the license authentication unit 50 generates a license code LC of the software SW based on the product key and device-unique information input when the request is made.

The license authentication apparatus 300 sends the generated license code LC as an authentication result to the request source, to respond to the authentication request. As a result, the license authentication control unit 20 obtains a license code.

<Saving a License Code>

The device management apparatus 100 receives, with the license authentication control unit 20, the license code LC (the license code LC obtained as an authentication result) input by the user when the user makes a license code saving request via a predetermined GUI relevant to license authentication (step S201).

The license authentication control unit 20 requests the common module CM to determine the authenticity/validity (check) of the input license code LC (step S202). Specifically, the license authentication control unit 20 passes the input license code LC, the product identification information SN, and version information of the software SW to the common module CM, and makes a check request.

The common module CM checks the authenticity/validity of the input license code LC based on the product identification information SN and version information given with the request (S203).

The common module CM responds to the check request by passing the check result to the request source. As a result, the license authentication control unit 20 obtains the check result of the authenticity/validity of the input license code LC that has been requested to be saved.

When the check result of the input license code LC indicates normal (OK), the license authentication control unit 20 accesses the license code saving unit 10 and saves the input license code LC that has been checked (determined normal) (step S204). In the license code saving unit 10, the input license code LC is stored and saved in a predetermined storage area (step S205).

As described above, the device management apparatus 100 performs the process of "issuing/saving a license code" corresponding to the software SW installed for implementing a function of the internal system 1.

FIG. 9 is a sequence diagram of the process of system registration according to the present embodiment.

<System Registration (Register Internal System to External System)>

When the device management apparatus 100 receives a registration request from a user via a predetermined GUI relevant to system registration, a pertinent report is sent to the license validity confirmation unit 31 included in the system management control unit 30 (step S301). The registration request is made for registering the internal system 1 (device management system 1 at a user's site), which is built by installing software SW, with the external system 2 (remote management system 2 at the manufacturer).

The license validity confirmation unit 31 requests the common module to determine (check) the authenticity/validity of an input license code LC (step S302). Specifically, the license validity confirmation unit 31 passes the product identification information SN and version information of the software SW to the common module CM to make the check request.

The common module CM accesses the license code saving unit 10 (step S303), and refers to a corresponding license code LC that is saved in the license code saving unit 10, based on the product identification information SN and version information given with the request (step S304). Accordingly, the common module CM checks the authenticity/validity of the license code LC corresponding to the software SW.

The common module CM responds to the check request by passing the check result to the request source. As a result, the license validity confirmation unit 31 obtains the check result indicating the authenticity/validity of the input license code LC corresponding to the software SW for implementing a function of the internal system 1 for which the registration request has been made.

When the check result of the input license code LC indicates normal (OK), the license validity confirmation unit 31 requests the license obtaining unit 32 included in the system management control unit 30 to obtain the license code LC corresponding to the software SW (step S401).

The license obtaining unit 32 accesses the license code saving unit 10 (step S402), and refers to the corresponding license code LC that has been saved (step S403). The license obtaining unit 32 identifies the corresponding license code LC based on the product identification SN and version information. Accordingly, the license obtaining unit 32 obtains the license code LC corresponding to the software SW as a reference result.

When the license code LC is normally obtained, the license obtaining unit 32 requests the system identification information generating unit 33 included in the system management control unit 30 to generate system identification information SID based on the obtained license code LC (step S501).

The system identification information generating unit 33 requests the common module CM to decode the obtained license code LC (step S502). When making the decode request, the system identification information generating unit 33 passes the obtained license code LC to the common module CM.

The common module CM decodes the obtained license code LC in response to the request (step S503). As a result, the common module CM obtains the information relevant to the software SW included in the obtained license code LC (for example, "product identification information" and "product key information").

The common module CM responds to the decode request by passing the above information obtained by decoding the license code LC (information relevant to the software SW) as the decode result to the request source. As a result, the system identification information generating unit 33 obtains the decode result (information relevant to the software SW) of the license code LC corresponding to the software SW for implementing the function of the internal system 1 for which the registration request has been made.

The system identification information generating unit 33 generates the system identification information SID for identifying the internal system 1 for which the registration request has been made, from the obtained product key information GPK included in the information relevant to the software SW obtained as a result of decoding (step S504). The software identification information extracting unit 33A of the system identification information generating unit 33 performs predetermined data processing on the obtained product key information GPK.

Specifically, the software identification information extracting unit 33A extracts and deletes random numbers (needless data) from the obtained product key information GPK. The software identification information extracting unit 33A extracts, from the obtained product key information GPK, a product key (software identification information) provided for the software SW by a vendor. The system identification information generating unit 33 uses the extracted product key as the system identification information SID. As described above, the system identification information generating unit 33 generates the system identification information SID.

When the system identification information generating unit 33 has generated the system identification information SID, the system identification information generating unit 33 requests the system registration unit 34 included in the system management control unit 30 to perform system registration to register the internal system 1 in the external system 2 (step S601). When making the registration request, the system identification information generating unit 33 passes the generated system identification information SID to the system registration unit 34.

The system registration unit 34 registers, in the external system 2, the internal system 1 for which the registration request has been made. Specifically, the system registration unit 34 generates the registration data 80 based on the generated system identification information SID (step S602). The system registration unit 34 generates the registration data 80 that is associated with registration request identification information RID, system identification information SID, and one or more device identification information DID items. The system registration unit 34 may associate the above information items with each other by using predetermined data tags to describe definitions in the registration data 80. Accordingly, based on system identification information SID, the system registration unit 34 generates the registration data 80 described in XML, for example.

The system registration unit 34 requests the remote management apparatus 400 to register the registration data 80 (step S603). Specifically, the system registration unit 34 sends the generated registration data 80 to the remote management apparatus 400 to make the registration request.

In the remote management apparatus 400, the information management unit 60 registers the internal system 1 based on the registration data (step S604). Specifically, the information management unit 60 analyzes the registration data 80 (analyzes the registration data 80 with a description language analyzing function such as an XML parser), and obtains definition data of the information items defined in the data. The information management unit 60 accesses the management information holding unit 70, and stores the obtained data in association with the corresponding items in the management information 71.

The management information holding unit 70 saves the data of the internal system 1 defined in the registration data 80, as the management information 71 (step S605).

The information management unit 60 in the remote management apparatus 400 responds to the registration request by passing the registration result to the request source. As a result, the device management apparatus 100 can report to the user as to whether the internal system 1, for which the registration request has been made, has been normally registered in the external system 2.

As described above, the device management apparatus 100 performs the process of "generating/registering the system identification information" for the internal system 1 built by installing the software SW.

<Summary>

As described above, the device management apparatus 100 according to the present embodiment generates system identification information SID for identifying the internal system 1 that has been built by installing software. The system identification information SID is generated based on authentication information (license code LC) obtained by performing license authentication on the software SW. The device management apparatus 100 extracts software identification information (product key) from the authentication information, and generates the system identification information SID based on the extracted software identification information. Subsequently, the device management apparatus 100 sends the generated system identification information SID to the external system 2 via a predetermined data transmission line, to register the system identification information SID as the management information 71. The device management apparatus 100 sends the registration data 80 including the generated system identification information SID to the remote management apparatus 400 of the external system 2, and saves the registration data 80 as the management information 71 in a storage device included in the remote management apparatus 400.

Accordingly, the system built by installing software in the device management system 1 can be identified by the external system 2 that is located remote from the device management system 1.

The "system management function" of the device management apparatus 100 according to the above-described embodiment may be implemented by performing the processes described with reference to the figures, by having the CPU 106 execute a program that is coded in a programming language corresponding to the operating environment (platform).

The program may be stored in the computer-readable recording medium 103A. The recording medium 103A may be, for example, a floppy (registered trademark) disk, a CD (Compact Disk), a DVD (Digital Versatile Disk), an SD memory card (SD Memory Card), and a USB (Universal Serial Bus) memory.

The program may be stored in the recording medium 103A and installed in the device management apparatus 100 via the drive device 103 or an external storage I/F (not shown) that can read the recording medium 103A. The device management apparatus 100 includes the interface device 107, and therefore the program may be installed by downloading the program via an electronic communications line such as the Internet.

In the above embodiment, the internal system 1, which is built in the user environment by installing software, can be identified by the external system 2 at the manufacturer; however, the present invention is not so limited. For example, the present invention is applicable to a case where a system is identified by another system within the same user environment including plural systems.

In the above embodiment, the registration data 80 is described in XML; however, the present invention is not so limited. The registration data 80 need not be in an XML format as long as it is in a format that can be analyzed by the information management unit 60 (a format described in a language corresponding to the description language analyzing function).

In the above embodiment, the registration data 80 associates the system identification information SID with device identification information DID; however, the present invention is not so limited. The device identification information DID is described as an example when the system to be registered is the device management system 1.

In the above embodiment, the system identification information generating unit 33 performs data processing by deleting random numbers from the product key information GPK that is obtained as a decoded result of the common module CM; however, the present invention is not so limited. The product key information GPK that is obtained as a decode result may or may not include random numbers depending on the specification of the license code issuing operation in the license authentication apparatus 300. Thus, the data processing method described above may vary according to the specification of the license code issuing operation.

The present invention is not limited to the specific embodiments described herein, and variations and modifications may be made without departing from the scope of the present invention.

The present application is based on Japanese Priority Patent Application No. 2009-162169, filed on Jul. 8, 2009, the entire contents of which are hereby incorporated herein by reference.

What is claimed is:

1. An information processing system in which a device management apparatus and a remote management apparatus are connected via a network, wherein
the device management apparatus includes a generating unit that generates registration information in which system identification information, registration request identification information and device identification information are associated with each other, wherein
the system identification information is generated from identification information of software to be installed in the device management apparatus and authentication information used for using the software, the system identification information being used for identifying an internal system built in the device management apparatus by installing the software,
the registration request identification information indicates which one of the internal systems for which the system identification information is provided, and
the device identification information is used for identifying a device managed by the device management apparatus, and wherein
the device management apparatus further includes a sending unit that sends, to the remote management apparatus, the registration information using the generated system identification information; and wherein
the remote management apparatus includes
a receiving unit that receives the registration information, and
a registering unit that registers the received registration information, and
wherein the device management apparatus further includes
an obtaining unit configured to obtain the authentication information corresponding to the software from a predetermined storage area that holds a plurality of the authentication information items, the authentication information being obtained based on product identification information for identifying a product provided as the software and version information indicating a version of the provided product,
wherein the generating unit generates the system identification information from the authentication information obtained by the obtaining unit.

2. The information processing system according to claim 1, wherein
the generating unit generates the system identification information based on product key information corresponding to the software to be installed in the device management apparatus.

3. The information processing system according to claim 2, wherein the device management apparatus further includes
an extracting unit that extracts, from the product key information, a product key that is provided for the software by a vendor, wherein
the generating unit uses the product key extracted by the extracting unit as the system identification information.

4. The information processing system according to claim 3, wherein
the extracting unit deletes, from the product key information, one or more random numbers attached to the product key when the license authentication is performed, and extracts the product key.

5. The information processing system according to claim 1, wherein the generating unit generates the registration request identification information and the device identification information used for identifying the device managed by the device management apparatus, when the system identification information is generated.

6. The information processing system according to claim 1, wherein the generating unit associates the system identification information, the registration request identification information and the device identification information are associated with each other, based on a predetermined description language format.

7. The information processing system according to claim 1, wherein the sending unit sends, to the remote management apparatus, the registration information in which the system identification information, the registration request identification information and the device identification information are associated with each other by the generating unit.

8. A method performed by an information processing system, said method comprising:
(a) generating registration information in which system identification information, registration request identification information and device identification information are associated with each other, wherein
the system identification information is generated from identification information of software to be installed in the information processing system and authentication information used for using the software, the system identification information being used for identifying an internal system built in the information processing system by installing the software,
the registration request identification information indicates a specific one of internal systems in the information processing system for which the system identification information is provided, and
the device identification information is used for identifying an information processing device in the information processing system; and
(b) causing the registration information in which the system identification information, registration request identification information and device identification information are associated with each other, to be registered; and
(c) obtaining the authentication information corresponding to the software from a predetermined storage area that holds a plurality of the authentication information items, the authentication information being obtained based on product identification information for identifying a product provided as the software and version information indicating a version of the provided product, wherein
the system identification information is generated in (a) from the authentication information obtained in (c).

9. The method according to claim 8, wherein
the system identification information is generated in (a) based on product key information corresponding to the software to be installed in the information processing systems.

10. The method according to claim 9, further comprising:
(c) extracting, from the product key information, a product key that is provided for the software by a vendor, wherein
the product key extracted in (c) is used in (a) as the system identification information.

11. The method according to claim 10, wherein
one or more random numbers attached to the product key is
   deleted from the product key information, when extracting the product key in (c).

* * * * *